United States Patent [19]

Engdahl

[11] Patent Number: 5,175,434
[45] Date of Patent: Dec. 29, 1992

[54] COMPTON SCATTER CAMERA
[75] Inventor: John C. Engdahl, Columbia, Md.
[73] Assignee: Sopha Medical Systems, Inc., Columbia, Md.
[21] Appl. No.: 723,571
[22] Filed: Jul. 1, 1991
[51] Int. Cl.⁵ .............................................. G01T 1/24
[52] U.S. Cl. .............................. 250/366; 250/370.09; 250/363.02
[58] Field of Search ........... 250/366, 367, 368, 370.09, 250/370.11, 363.02, 363.07, 363.09, 363.10, 369; 364/413.24

[56] References Cited

U.S. PATENT DOCUMENTS

| | | | |
|---|---|---|---|
| 4,529,882 | 7/1985 | Lee | 250/370.09 X |
| 4,584,478 | 4/1986 | Genna et al. | |
| 4,857,737 | 8/1989 | Kamae et al. | 250/370.09 |

OTHER PUBLICATIONS

Everett et al., Gamma-Radiation Imaging System Based on the Compton Effect, PROC. IEEE, vol. 124, No. 11, Nov. 1977, pp. 995-1000.
Dogan et al., Multiple Compton Scattering Gamma Ray Imaging Camera, Nuclear Instruments and Methods in Physics Research A299 (1990) pp. 501-506.
Singh et al., Experimental Test-Object Study of Electronically Collimated SPECT, Journal of Nuclear Medicine, vol. 31, No. 2, Feb. 1990, pp. 178-186.

Primary Examiner—Constantine Hannaher
Assistant Examiner—Edward J. Glick
Attorney, Agent, or Firm—Rothwell, Figg, Ernst & Kurz

[57] ABSTRACT

A Compton scatter camera for nuclear medical imaging includes an annular scattered photon detector disposed around a first scattering detector and shielded from the field of view of incident gamma photons. Scattered photons detected by the annular detector are thus scattered through angles greater than those of a conventional Compton scatter geometry. Sensitivity and count rate capability is thus significantly increased over the conventional scatter camera, so as to present the possibility for a commercially feasible Compton scatter camera to be realized.

23 Claims, 8 Drawing Sheets 5,175,434

1

COMPTON SCATTER CAMERA

BACKGROUND OF THE INVENTION

1. Field of the Invention

This invention relates generally to imaging devices used in nuclear medicine, and more specifically relates to nuclear imaging cameras using the Compton scatter principle.

2. Background and Prior Art

In nuclear imaging, a patient is injected with or swallows a radioactive isotope which has an affinity for a particular organ. Gamma rays are then emitted from the organ of interest, and are detected by a gamma ray camera device which forms an image of the organ based on the concentration and distribution of the radioactive isotope within the organ.

Almost all conventionally utilized gamma ray cameras are of the so-called Anger type gamma cameras as disclosed in U.S. Pat. No. 3,011,057. The Anger camera uses a scintillation crystal, such as a NaI crystal, which absorbs incident gamma rays from the object under study and interacts with the gamma ray to produce light events. An array of photomultiplier tubes is placed adjacent to the crystal in order to detect and amplify these light events so as calculate the spatial location and energy level of the incident gamma ray to produce a two dimensional image of the object which then may be displayed on a CRT or printed as a hard copy.

Since the scintillation crystal is only capable of producing a light event at the position where a gamma ray was absorbed, there is no way to determine the direction from which the gamma ray emanated by merely detecting the light event in the crystal. Therefore, in the Anger type camera, a collimator must be placed between the source of the gamma rays and the crystal, such that the gamma rays impinging on the crystal are restricted to a narrow angle. As such, the direction of the incident gamma ray can be assumed from the detected position in the crystal.

As a result of the necessity of collimation of the incident gamma rays, the Anger camera exhibits a relatively low sensitivity, which is defined as that fraction of gamma rays emanating from the source which actually reach the detector to produce a detected event that contributes to the composition of the image.

In addition to sensitivity, the performance of the Anger camera is limited by several other factors, including the spatial resolution or ability of the camera to distinguish between adjacently located gamma rays emanating from an object, the energy resolution or ability of the camera to distinguish between adjacent energy levels of incident gamma rays, and the counting rate capability or ability of the camera to process a certain number of incident gamma rays per unit time into information used in the formation of the image.

The concept of Compton scattering and its application to the nuclear imaging field was first proposed by D. B. Everett et al. in the paper entitled *Gamma-radiation Imaging System Based On the Compton Effect*, Proc. IEE, Vol. 124 (11), (1977), p. 995. In a Compton scatter camera, a first semiconductor detector interacts with and scatters an incident gamma photon, which is then captured or absorbed by a second detector. The scattering angle is uniquely determined as a function of the incident and scattered energy levels of the gamma photon. The energy levels and positions of the incident photon scatterings and scattered photon absorptions are measured in the detectors, and the resultant scattering angle is calculated, whereby the direction from which the gamma ray emanated can be computed to within a conic section.

FIG. 1 illustrates the principle of a conventional Compton scatter camera, in which a scatter detector 10 is provided parallel to a second detector 12 and between the second detector and a source of gamma radiation 14. A gamma photon radiates from the source 14 along an incident path 16 and impinges on the scatter detector 10 at point A, whereupon it is scattered at an angle $\theta$ and thereafter impinges on the second detector 12 at point B along a scattering path 18.

The difference between the incident energy of the gamma photon and the scattered energy of the gamma photon is a measure of the scattering angle $\theta$. The energy difference is measured by the first detector, and the scattered energy is measured by the second detector. The common expression of the Compton scattering formula computes the scattered energy as a function of the incident energy and the scattering angle $\theta$ as follows:

$$E_{sc} = \frac{E_{in}}{1 + \frac{E_{in}}{511 keV}(1 - \cos\theta)} \quad (1)$$

wherein $E_{sc}$ = energy of scattered photon
$E_{in}$ = energy of incident photon Solving for $\cos(\theta)$, the following equation is obtained:

$$\cos(\theta) = \frac{-511\left|\frac{E_{in}}{E_{sc}} - 1\right|}{E_{in}} + 1 \quad (2)$$

The energy deposited in the second detector is equal to the scattered energy $E_{sc}$ of the gamma photon, and the energy deposited in the first detector, $E_{df}$, is the difference between the incident energy and the scattered energy, such that $E_{in} = E_{df} + E_{sc}$. The thus calculated incident energy is compared with a preselected energy window to determine whether the detected event is valid. If the calculated incident energy is within the window, the value of $E_{in}$ is thereafter assumed to be the ideal value for the particular radioisotope being used for imaging. Because the measured value of the scattered energy $E_{sc}$ is not precise enough to calculate $\theta$ with sufficient accuracy, $E_{sc}$ is substituted for in the above equation (2), to obtain the following equation from which the angle $\theta$ can be directly calculated:

$$\cos(\theta) = \frac{-511\left|\frac{E_{in}}{E_{in} - E_{df}} - 1\right|}{E_{in}} + 1 \quad (3)$$

Once the angle $\theta$ has been calculated, the location of the incident gamma ray on the image plane can be projected to within a conic section with the apex of the cone at the point of scattering on the first detector. The reason for this is that there is no information on the azimuthal angle in the plane of the first detector, therefore a photon of polar angle $\theta$ at any azimuthal angle from 0-2π will produce the same energy in the detector.

The Compton scatter camera eliminates the requirement for a collimator, since the direction of an incident gamma photon can be inferred to within a conic section of possible directions. Thus, the sensitivity of a Compton scatter camera theoretically can be made much higher than that of an Anger camera.

Notwithstanding this advantage, Compton scatter cameras have not been commercially developed to date as a result of difficulties in achieving adequate performance characteristics for nuclear imaging applications. As shown in FIG. 1, the first detector 10 and the second detector 12 of the conventional Compton scatter camera are oriented coplanar to each other, with the second detector behind the first detector. The first detector 10 must necessarily be of a small thickness to allow scattered gamma rays to exit the detector without further interaction, while the second detector 12 must have a thickness to maximize the probability of absorbing a scattered gamma photon. A "desired event" is defined as a gamma ray that is scattered from a point of interaction in the first detector, where the position of the interaction and the amount of energy deposited in the first detector are measured, to a point in the second detector without further interaction in the first detector, where the scattered gamma ray is absorbed. The position and energy of the scattered gamma ray is measured in the second detector. Because the thickness of the first detector 10 must be small in order to maximize the probability of recording a desired event, it is necessarily true that a large fraction of gamma rays emanating from the source and impinging on the first detector through angles subtended by the first detector to the source distribution, will pass through the first detector without interaction. As these unscattered gamma rays are more numerous than desired events captured and absorbed by the second detector, the number of desired events that can be detected per unit time in the second detector (or the counting rate capability) is severely limited.

A second difficulty results from the range of scattering angles of gamma rays which are detectable by the second detector to produce a valid event. As seen in FIG. 1, the scattered photons that are detectable in the second detector are those scattered through angles from 0° to less than 90°. As is evident from equation (1), the scattered energy $E_{sc}$ varies as a function of the scattering angle, and thus the amount of energy $E_{df}$ deposited in the first detector varies inversely with the scattered energy $E_{sc}$. The energy $E_{df}$ deposited in the first detector increases as the scattering angle increases, from zero energy at a scattering angle of 0°. The ability of the first detector to resolve the amount of energy deposited improves as the deposited energy is increased. FIG. 3 shows the relationships between the uncertainty with which the scattering angle can be computed as a function of the actual scattering angle, for various energy resolutions of the first detector expressed as the full width at half maximum (FWHM) in keV.

The spatial resolution performance of the camera is dependent on the uncertainty in the computed scattering angle. Therefore, gamma rays with scattering angles of 0°-30° will cause poorer spatial resolution performance than gamma rays with scattering angles of 40°-110°, as shown in FIG. 3 for an incident energy of 140 keV, the most commonly used radioisotope in medical nuclear imaging applications.

Thus, in the prior art Compton camera detected events having scattering angles of less than 30° would not be used as data in the construction of an image because of their poor spatial resolution. Such results in a significantly decreased sensitivity.

Yet another shortcoming in the conventional Compton camera limiting the sensitivity is the requirement that the thickness of the first detector be made small to increase the probability that scattered gamma rays will exit the first detector in the direction of the second detector without undergoing further interactions within the first detector. Because of the necessary thinness of the first detector, the probability of incident gamma ray interaction is itself decreased, as a high fraction of gammas will pass through the first detector without undergoing any interaction.

Additionally, deconvolution of the image from the cones of possible gamma photon paths requires the use of highly complex mathematics. As shown in FIG. 1, the intersection of the locus of possible paths 17 with the image plane is usually an ellipse or a large segment thereof. The amount of uncertainty in the true direction from which the gamma ray emanated is therefore maximum when the conic section of possible solutions completely intersects the image plane, which is usually the case in the geometry of the prior art. The relative degree of uncertainty inversely affects the accuracy with which the true gamma source distribution can be deconvolved from the data contained in the recorded events.

SUMMARY OF THE INVENTION

The present invention provides a novel Compton scatter camera which solves or significantly reduces all of the above mentioned problems associated with conventional scatter cameras.

The present invention also provides a Compton scatter camera which has a significantly higher count rate capability than the prior art.

The present invention further provides a Compton scatter camera which exhibits a higher sensitivity than the prior art scatter camera.

The present invention still further provides a Compton scatter camera having first detector means for detecting incident photons emanating from a source and impinging on a surface thereof and scattering the photons at random angles with respect to the angle of incidence of the photons, second detector means, substantially surrounding the first detector means, for detecting scattered photons scattered from the first detector means within a predetermined range of scattering angles, impinging on a surface thereof substantially orthogonal to the surface of the first detector means, means for computing a deposition energy level and position of an incident photon scattering within the first detector means, means for computing an energy level and position of a scattered photon impinging on the second detector means, means for computing the scattering angle of the scattered photon as a function of the computed energy levels of the incident and scattered photons, and means for computing the location of the source of the incident photons based on the computed scattering angle and the computed positions on the first and second detector means.

BRIEF DESCRIPTION OF THE DRAWINGS

The present invention will become more fully understood from the detailed description given herein below and the accompanying drawings which are given by way of illustration only, and are not limitative of the present invention, and wherein.

DETAILED DESCRIPTION OF THE PREFERRED EMBODIMENTS

Figure 1:
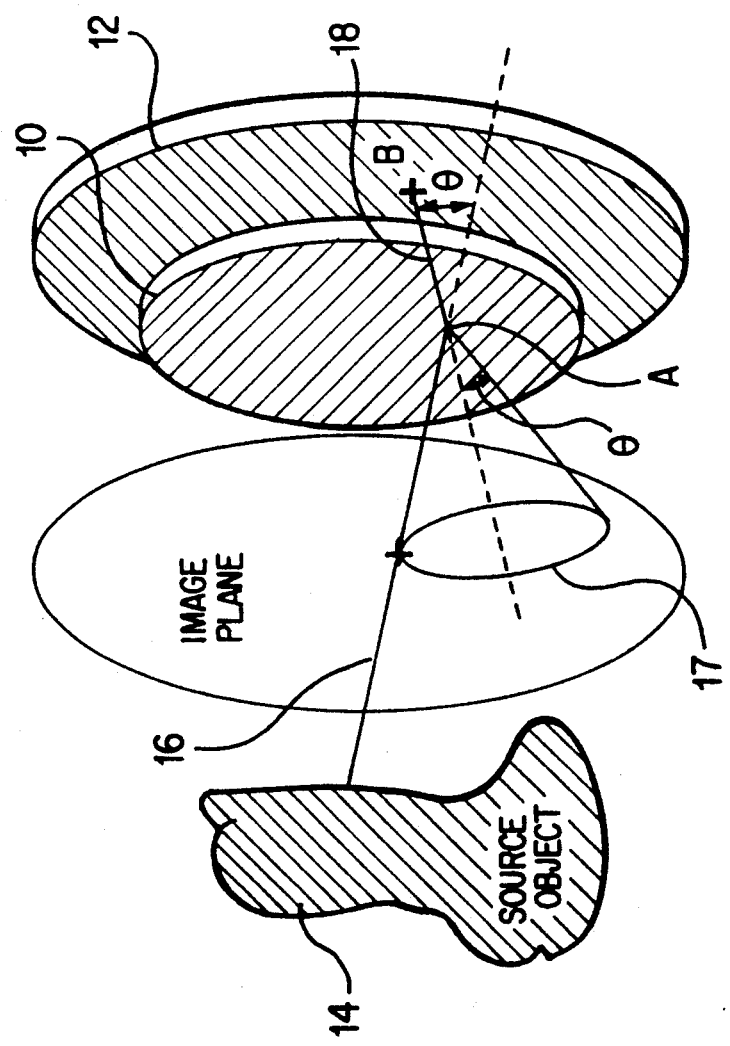
FIG. 1 is a conceptual perspective diagram of a conventional Compton scatter camera of the prior art.
Figure 2:
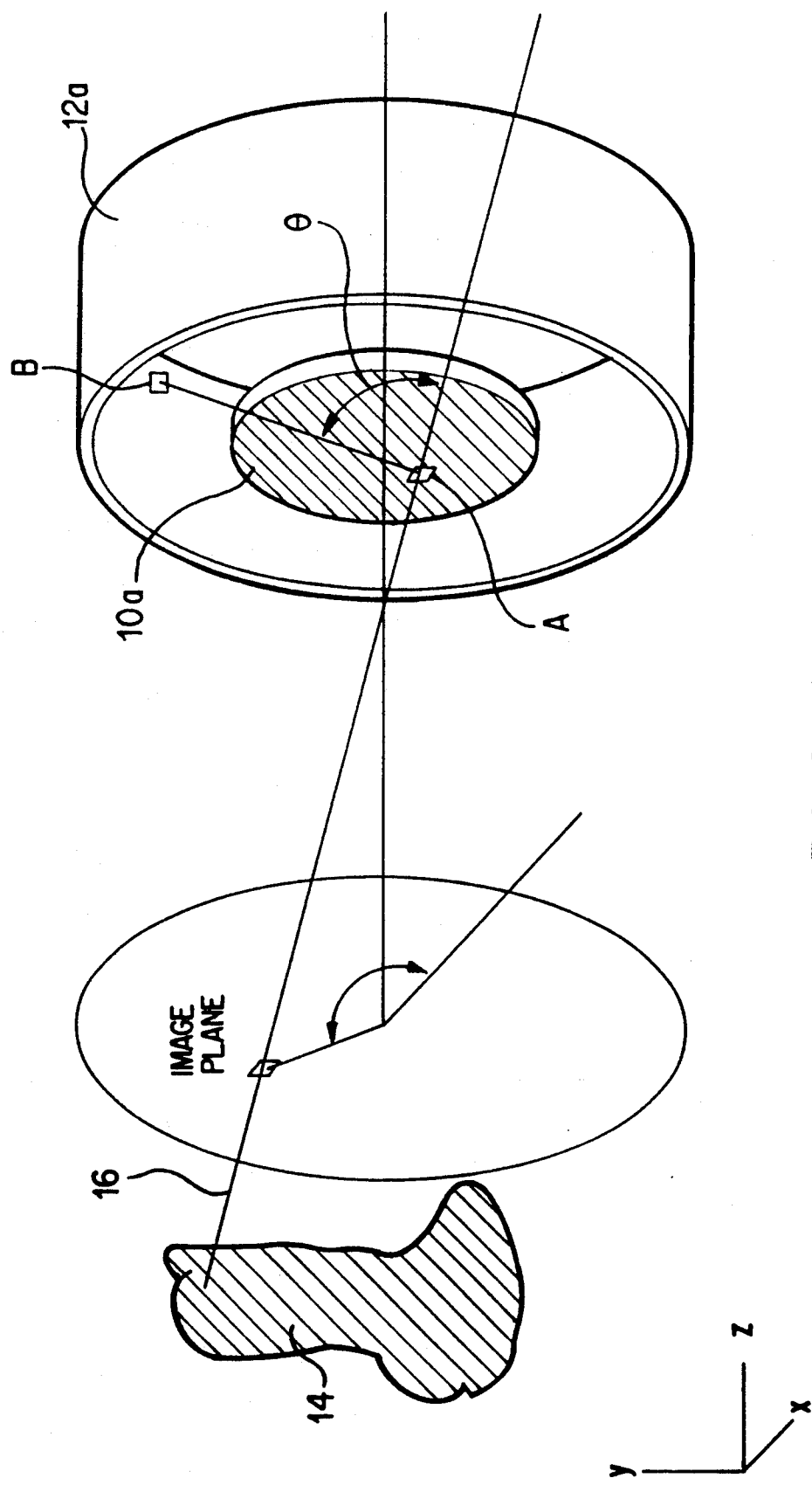
FIG. 2 is a conceptual perspective diagram of a Compton scatter camera according to one preferred embodiment of the present invention.

FIG. 2 is a diagram showing the basic configuration of a Compton scatter camera according to one embodiment of the invention. In the figure, elements analogous to those of FIG. 1 are given the same reference numerals. The camera of FIG. 2 contains a first, or scattering, detector 10a, which is planar and is oriented such that the detecting surface upon which incident gamma photons impinge is parallel to the image plane. The detector 10a is preferably disk shaped, but may be of any equivalent shape such as square, rectangular, oval or the like.

Figure 4:
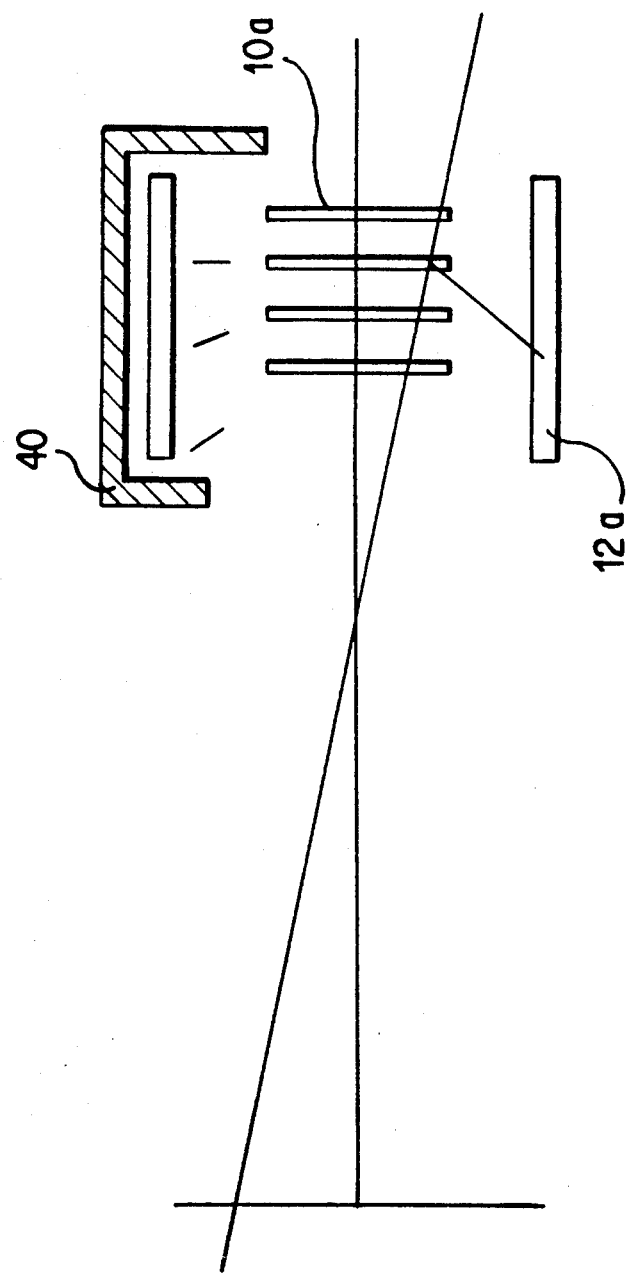
FIG. 4 is a cross-sectional diagram of a Compton scatter camera according to a second preferred embodiment of the present invention.
Figure 6:
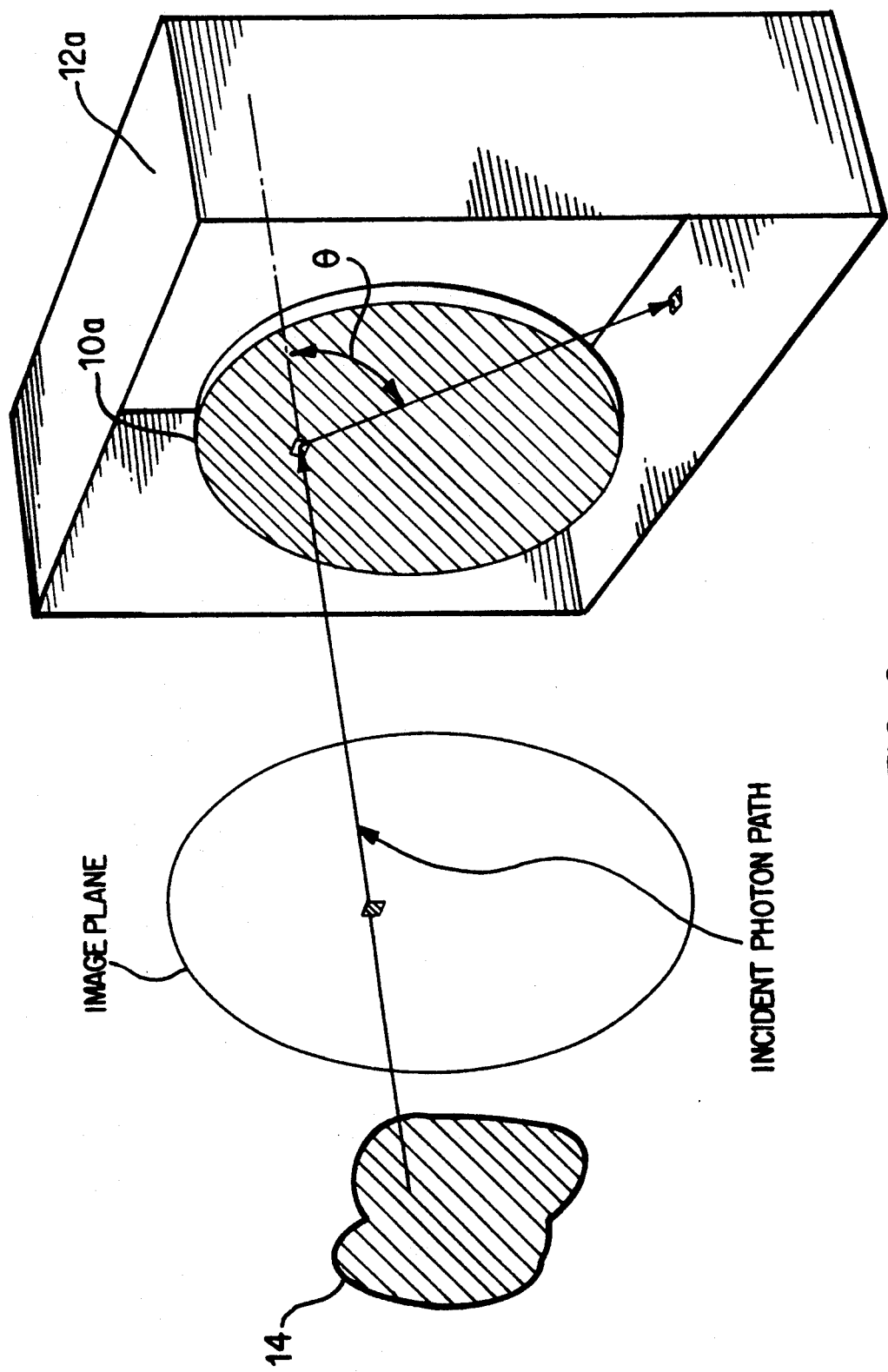
FIGS. 6, 7 and 8 are plan views of various alternate shapes for detector 12a of FIG. 2.
Figure 7:
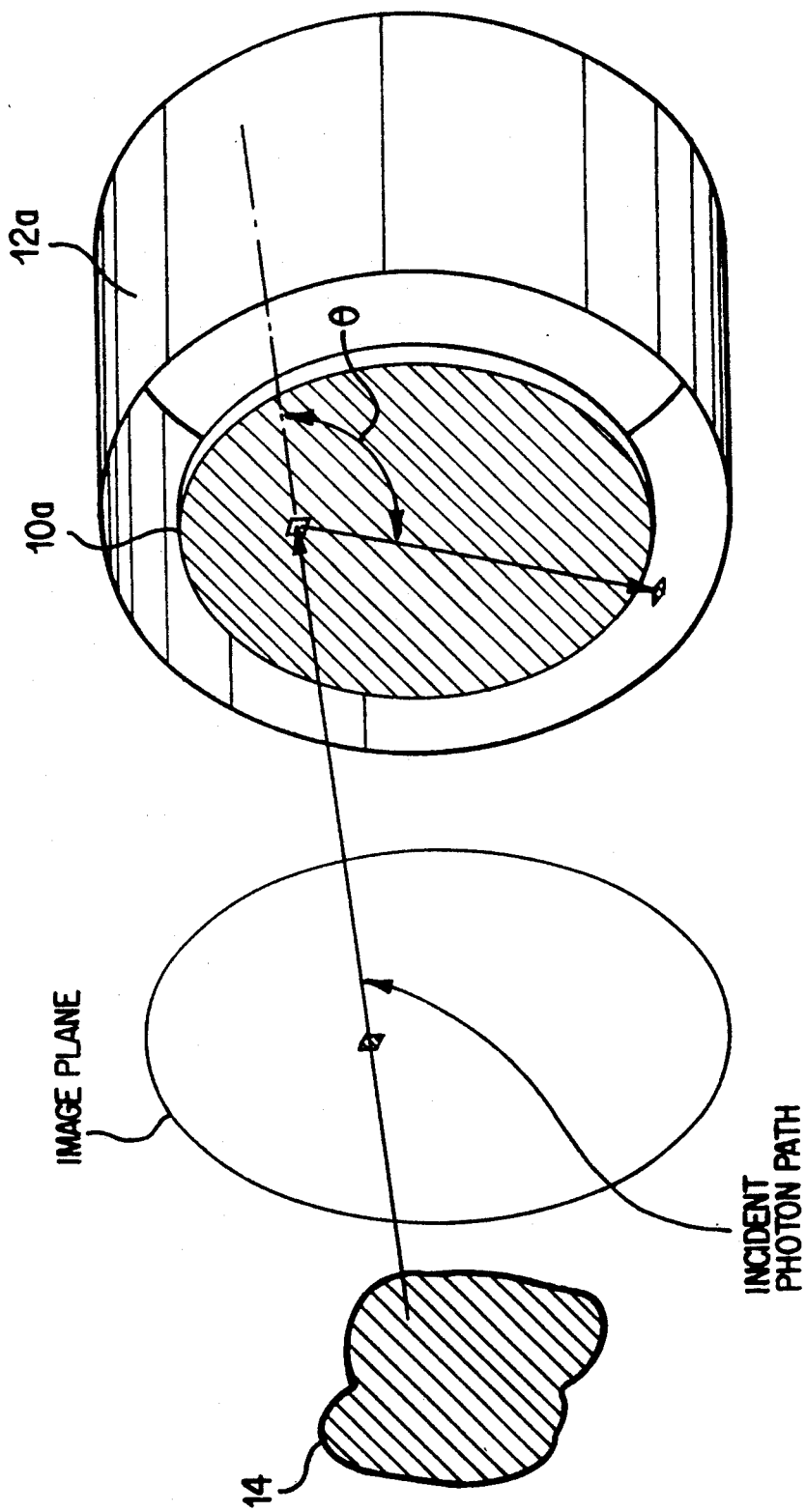
Figure 8:
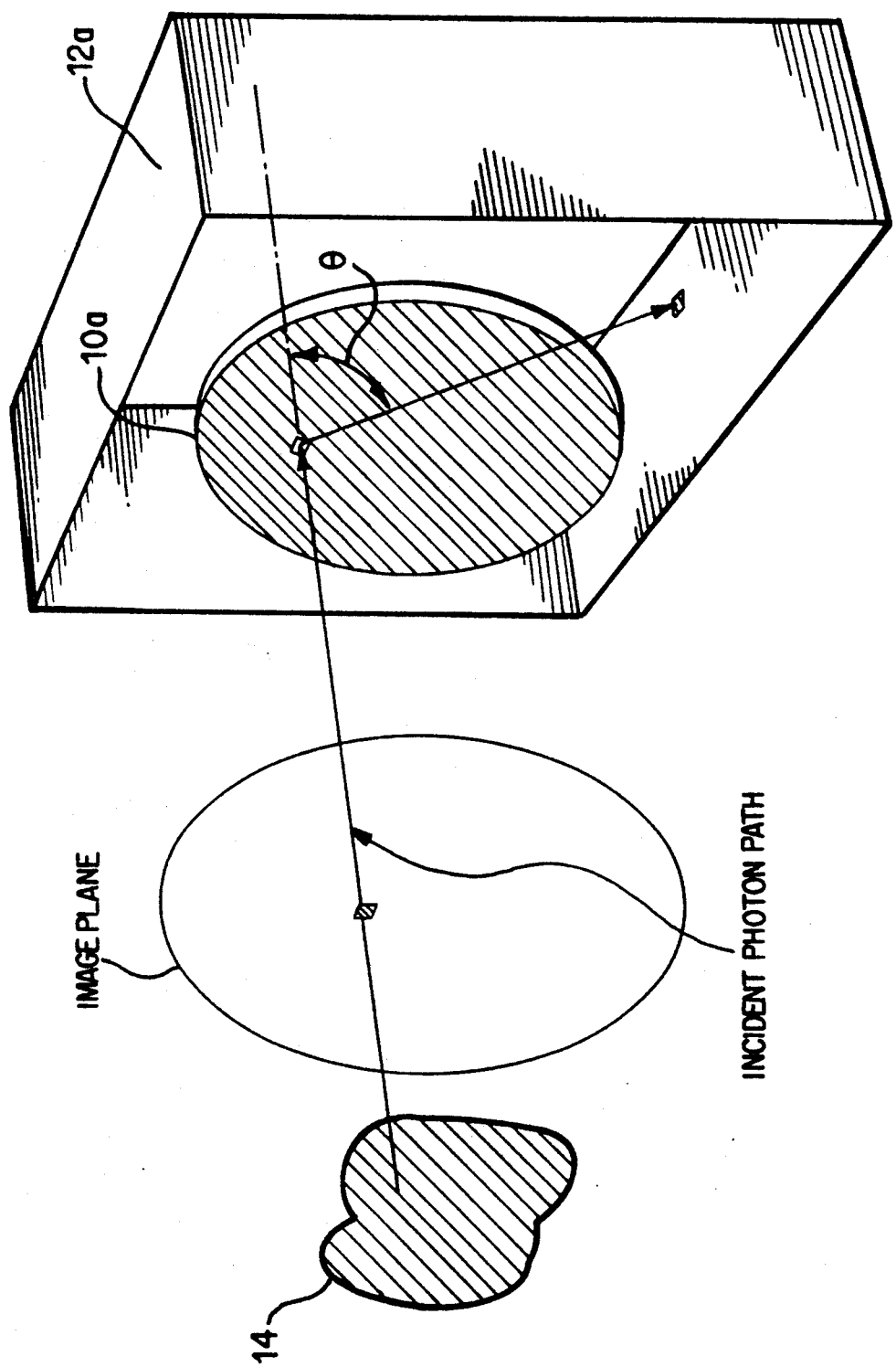

Surrounding the first detector 10a is a second, or scattered photon, detector 12a which is annular and the detecting surface of which is oriented orthogonal or substantially orthogonal to the surface of detector 10a. The second detector 12a is preferably cylindrical in shape, but may be of any equivalent shape such as square, elliptical, circular or the like, the only requirement being that the detecting surface of the second detector surround or envelope the first detector 10a in order to detect scattered photons from the first detector in any direction around the periphery thereof. FIGS. 6, 7 and 8 respectively show detectors 12a in the form of a square, an ellipse, and a rectangle In a preferred embodiment the second detector completely surrounds the first detector; however such is not necessary for the camera to provide images. That is, there may be discontinuities in the second detector surface area, such as spaces between discrete planar detectors provided around the first detector 10a. The second detector 12a is shielded from incident photons emanating through the image plane by a suitable photon shield 40, not shown in FIG. 2, but which is illustrated in FIG. 4. Such shielding of the second detector from incident or primary photons greatly reduces the amount of incident photons impinging on the second detector, and thus significantly improves the percentage of counted events in the second detector that are used in the formation of the image.

Figure 3:
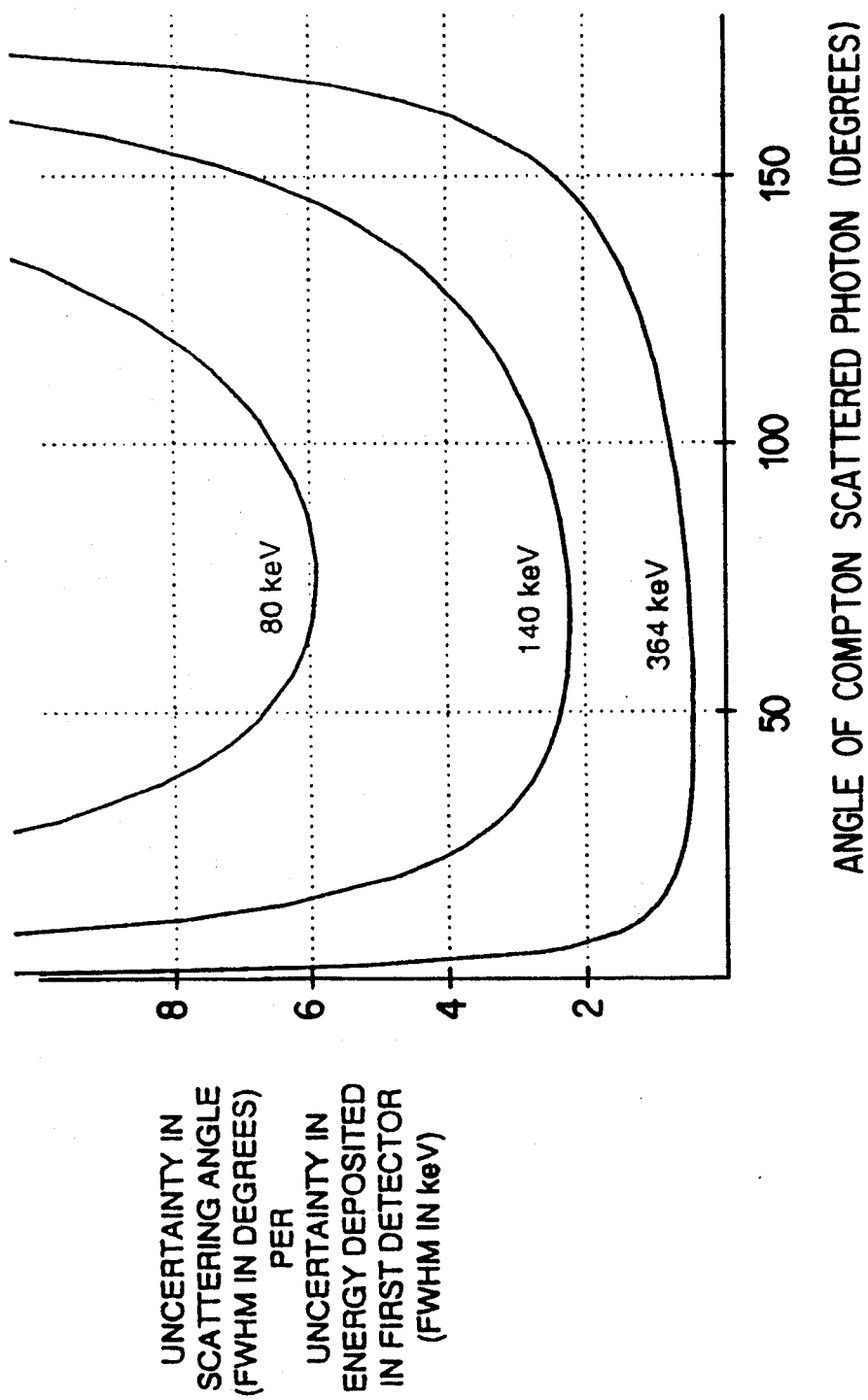
FIG. 3 is a graph plot of the uncertainty in a measured scattering angle as a function of the scattering angle, given for three typical gamma ray energies of interest in nuclear medicine.

FIG. 3 shows the uncertainty in the scattering angle in percent FWHM (full width at half maximum) in degrees per FWHM in keV (energy resolution of the first detector), as a function of scattering angle for incident gamma photons at energies of 80, 140 and 364 keV.

As can be seen, the lowest uncertainties occur for photons scattered in the range of 50°-100°.

By virtue of the geometry of the Compton scatter camera according to the present invention, the photons detected by the second detector 12a are those that have been scattered at scattering angles of 60°-120° (90°±30°), as opposed to angles of 0°-90° in the conventional scatter camera. Since such scattered photons have deposited a greater amount of energy in the first detector, uncertainty in the calculated scattering angle is greatly reduced, as shown in FIG. 3.

Since the rate of incident photons impinging on the second detector 12a is vastly reduced in the geometry according to the present invention, the count rate capability of the camera in counting desired events is much higher than that of the prior art Compton camera. As a result, an image can be obtained in a much shorter amount of time because a higher dosage of radioactive pharmaceutical can be used than with the conventional Compton camera. The dosage which could be used in a conventional Compton camera is severely limited as compared with the standard patient dosages used in conjunction with the conventional Anger camera.

Thus, as compared to the conventional Anger camera technology, the Compton camera of the present invention allows an image to be obtained faster by using the same dosage of radiopharmaceutical, or alternatively allows an image to be obtained in the same amount of time using a significantly reduced dosage.

It should be noted that both germanium and silicon detectors can be used for the first detector 10a in the present invention to fulfill the above-mentioned requirements for high probability of gamma scattering interaction and high probability of scattered gamma exit from the first detector. In addition, other semiconductor materials may be also suitable for use as detectors.

The second detector is required to have a high probability of photon absorption and thus must be selected from the group of high Z materials. Preferably, a large area scintillation crystal detector such as NaI(Tl) is used as the second detector 12a. The energy resolution of the scintillation crystal detector must be high enough (i.e. the FWHM of the distribution must be relatively small) to measure the energy of the scattered photons impinging thereon in order to allow the total energy of the incident photon to be computed from the sum of the scattered energy $E_{sc}$ and the energy $E_{df}$ deposited in the first detector. As discussed above, this total energy is compared to a predetermined energy window in order to determine whether the detected event is a valid one that can be used in the composition of the image.

FIG. 4 shows a second embodiment of the invention in which a plurality of first detectors 10a are utilized. Because the material of the first detector is of relatively low Z to maximize the probability that the incident photons will be scattered rather than absorbed within the first detector, and must be of small width to allow the scattered photon to exit without further interaction, the probability that a photon will be transmitted through the first detector without being scattered also will be high. The first detector also must be relatively thin in order to localize the position of the scattering interaction and have sufficient energy resolution to measure $E_{df}$, and thus typically the detector is manufactured of semiconductor materials having limited depletion depths.

Because the second detector 12a is not placed behind the first detector as in the conventional scatter camera, multiple first detectors 10a can be used to maximize the number of scattered photons reaching the second detector. The additional first detectors function to scatter photons which may have passed through previous first detectors without being scattered. The sensitivity of the camera thus may be increased to first order by approximately the number of multiple first detectors used.

Figure 5:
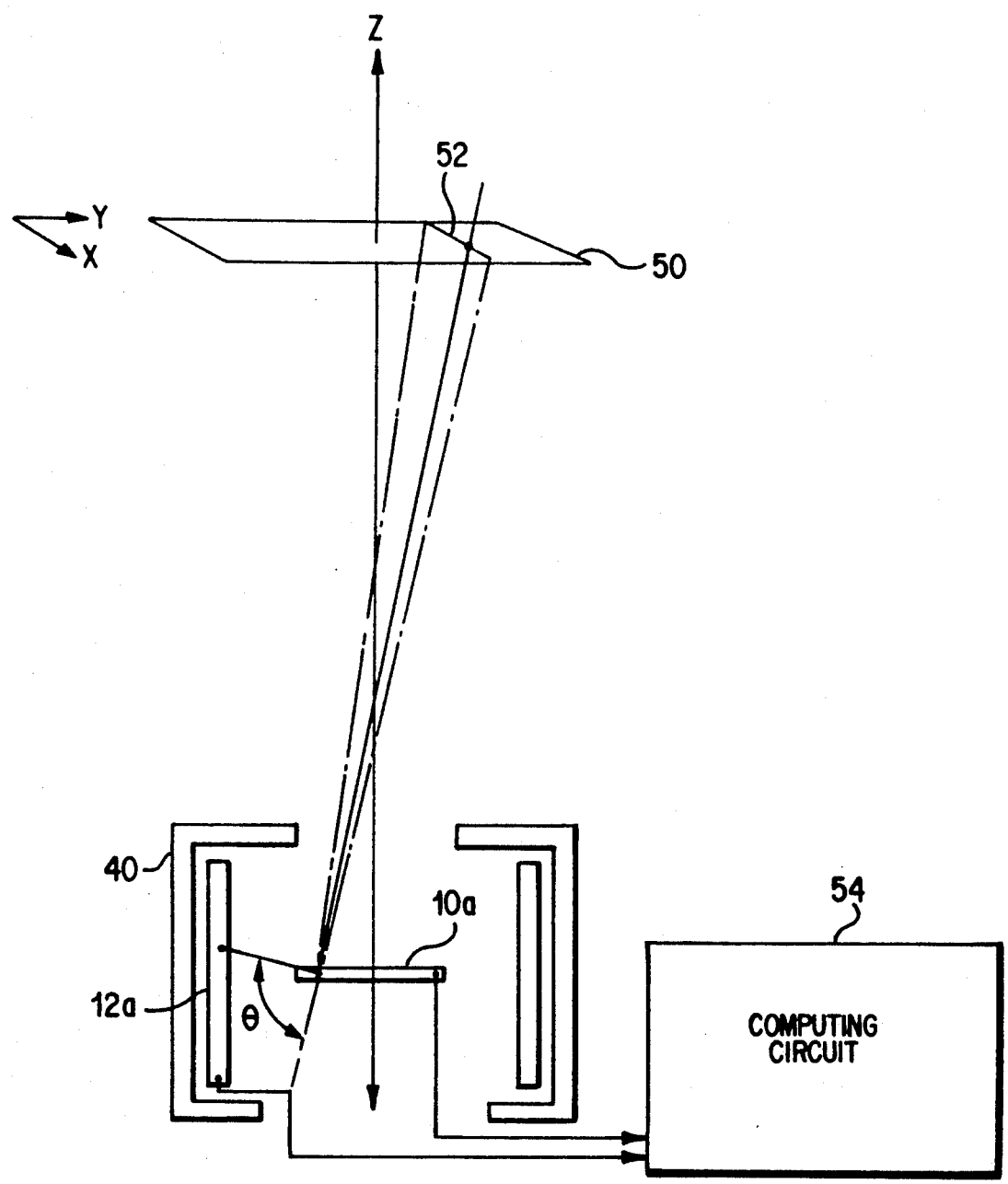
FIG. 5 is a part perspective and part cross-sectional conceptual diagram showing the locus of points within which the incident photon location may be resolved in the Compton scatter camera according to the present invention, and a computing circuit for calculating and storing the various parameters.

Referring to FIG. 5, because the second detector 12a is oriented to subtend the solid angle defined by a range of polar angles of typically 60°–120° relative to the incident photon directions, the conical section of possible solutions to the direction of photon emission only partly overlaps the image plane 50, and thus rather than a circle or ellipse, the locus of possible solutions is reduced to an arc or cord 52. A computing circuit 54 is provided with the position and energy values from detectors 10a and 12a to thus compute the scattering angle $\theta$ according to equation (3) above. The planar image is then reconstructed using a known maximum likelihood or other iterative algorithm, and thus restricting the set of possible solutions to arcs simplifies the calculations and decreases the uncertainty in the true incident gamma ray direction as opposed to a set of circles or ellipses. The computing circuit 54 may be implemented by a conventional data processor. The algorithms for image reconstruction may the same as conventionally known in the art.

The scatter camera of the present invention thus exhibits a much higher sensitivity than presently commercialized Anger cameras, while having count rate capability and sensitivity significantly higher than the conventional Compton scatter camera.

The invention having been thus described, it will be obvious to those skilled in the art that the same may be varied in many ways without departing from the spirit and scope of the invention. Any and all such modifications are intended to be included within the scope of the following claims.

What is claimed is:

1. A Compton scatter camera, comprising:
    first detector means for detecting incident photons emanating from a source and impinging on a first major surface thereof, and scattering said photons at random angles with respect to the angle of incidence of said photons, said first detector means also having a second major surface opposite and parallel to said first major surface;
    second detector means, substantially surrounding said first and second major surfaces of said first detector means, for detecting scattered photons scattered from said first detector means within a predetermined range of scattering angles, impinging on a surface thereof substantially orthogonal to the surface of said first detector means;
    means for computing a deposition energy level and position of an incident photon scattering within said first detector means;
    means for computing an energy level and position of a scattered photon impinging on said second detector means;
    means for computing the scattering angle of said scattered photon as a function of said computed energy levels of said incident and scattered photons; and
    means for computing the location of the source of said incident photons based on said computer scattering angel and said computed positions on said first and second detector means.

2. A Compton scatter camera as set forth in claim 1, wherein said incident photons are gamma rays.

3. A Compton scatter camera as set forth in claim 2, wherein said first detector means is a silicon gamma ray detector.

4. A Compton scatter camera as set forth in claim 2, wherein said first detector means is a germanium gamma ray detector.

5. A Compton scatter camera as set forth in claim 2, wherein said second detector means is a scintillation crystal detector.

6. A Compton scatter camera as set forth in claim 5, wherein said first detector means is shaped in the form of a disk and said scintillation crystal detector has an annular shape which substantially surrounds said disk.

7. A Compton scatter camera as set forth in claim 5, wherein said scintillation crystal detector is shaped in the form of a square.

8. A Compton scatter camera as set forth in claim 5, wherein said scintillation crystal detector is shaped in the form of a rectangle.

9. A Compton scatter camera as set forth in claim 5, wherein said scintillation crystal detector is shaped in the form of an ellipse.

10. A Compton scatter camera as set forth in claim 5, further comprising shield means for shielding said scintillation crystal detector from incident gamma ray photons.

11. A Compton scatter camera as set forth in claim 6, further comprising shield means for shielding said scintillation crystal detector from incident gamma ray photons.

12. A Compton scatter camera as set forth in claim 7, further comprising shield means for shielding said scintillation crystal detector from incident gamma ray photons.

13. A Compton scatter camera as set forth in claim 8, further comprising shield means for shielding said scintillation crystal detector from incident gamma ray photons.

14. A Compton scatter camera as set forth in claim 9, further comprising shield means for shielding said scintillation crystal detector from incident gamma ray photons.

15. A Compton scatter camera as set forth in claim 1, wherein said predetermined range of scattering angles is in the range of 60°–120°.

16. A Compton scatter camera as set forth in claim 1, wherein said first detector means comprises a plurality of stacked silicon disks.

17. A Compton scatter camera as set forth in claim 1, wherein said first detector means comprises a plurality of stacked germanium disks.

18. A Compton scatter camera, comprising:
    first detector means for detecting incident gamma rays emanating from a source and impinging on a surface thereof, and scattering said gamma rays at random angles with respect to the angle of incidence of said gamma rays, said first detector means comprising a low Z material having a high probability of Compton scattering interaction with said incident gamma rays;
    second detector means, substantially surrounding said first detector means and oriented substantially perpendicular to said surface of said first detector means, for detecting scattered gamma rays from said first detector means impinging on a surface thereof substantially orthogonal to the surface of said first detector means, said second detector means comprising a high Z material having a high probability of photon absorption interaction with said scattered gamma rays;

means for shielding said second detector means from incident gamma rays;

means for computing an energy deposition level and position of an incident gamma ray scattering within said first detector means;

means for computing an energy level and position of a scattered gamma ray absorbed within said second detector means;

means for computing the scattering angle of said scattered gamma ray as a function of said computed energy levels of said incident and scattered photons; and means for computing the location of the source of said incident gamma rays based on said computed scattering angle and said computed positions on said first and second detector means.

19. A Compton scatter camera as set forth in claim 18, wherein said first detector means comprises a silicon disk, and said second detector means comprises an annular scintillation crystal.

20. A Compton scatter camera as set forth in claim 19, wherein said first detector means comprises a plurality of stacked silicon disks.

21. A Compton scatter camera as set forth in claim 18, wherein said first detector means comprises a germanium disk, and said second detector means comprises an annular scintillation crystal.

22. A Compton scatter camera as set forth in claim 19, wherein said first detector means comprises a plurality of stacked germanium disks.

23. In a Compton scatter camera having a first detector for detecting incident photons emanating from a source and impinging on a surface thereof perpendicular to said source, and scattering said photons by interaction of said photons within said first detector, the improvement comprising:

a second detector for detecting scattered photons from said first detector having a range of scattering angles including scattering angles greater than 90°.

* * * * *

UNITED STATES PATENT AND TRADEMARK OFFICE
CERTIFICATE OF CORRECTION

PATENT NO. : 5,175,434
DATED     : December 29, 1992
INVENTOR(S) : John C. Engdahl It is certified that error appears in the above-identified patent and that said Letters Patent is hereby corrected as shown below:

Col. 5, line 49, "rectangle" should be --rectangle.--.

Col. 7, line 66, "computer" should be --computed--.

Col. 7, line 67, "angel" should be --angle--.

Signed and Sealed this

Twenty-sixth Day of October, 1993

Attest:

BRUCE LEHMAN

Attesting Officer    Commissioner of Patents and Trademarks